United States Patent Office.

R. O. LOWREY, OF SALEM, NEW YORK.

Letters Patent No. 91,458, dated June 15, 1869.

---

IMPROVED FABRIC FROM FIBROUS SHEETS AND HARD RUBBER.

---

The Schedule referred to in these Letters Patent and making part of the same.

---

*To all whom it may concern:*

Be it known that I, R. O. LOWREY, of Salem, in the county of Washington, and State of New York, have invented certain new and useful Improvements in Covering and Uniting Paper, Woven Fabrics, Wood, &c., with Hard Rubber; and I do hereby declare that the following is a full, clear, and exact description thereof.

To enable others skilled in the art to construct and use my invention, I will proceed to describe it.

My invention relates to new and useful compositions of matter, and consists in coating, covering, or combining fibrous materials, such as wood, paper, and similar articles, with hard-rubber compound, and then vulcanizing it.

In this way I produce a cheap and durable material, especially adapted to many important purposes in building, such as roofing, siding, sheathing, &c., as well as for flooring, and for the construction of many things where a hard-finished surface is required.

I first select and prepare the materials to be covered or coated, making them of any form desired, suitable for the uses for which they may be designed.

For roofing, siding, sheathing, flooring, and similar purposes, thin boards, paper, or fabrics of any suitable kind may be used.

When paper, or fabrics of any kind are used, I prefer such as have been made water-repellent, either in the process of manufacture, or after being manufactured.

The materials thus selected and prepared, of whatever kind, I cover with a coating of hard-rubber compound, of suitable thickness for the purpose designed, spreading it upon one or all sides of the materials, as desired, and then place them in an oven, and vulcanize the rubber in the usual manner.

When this is done, the material will have on all its sides, to which the rubber compound was applied, a hard, durable, and smooth coating of vulcanized rubber, and is ready for the uses for which it was designed.

Instead of coating a single sheet of paper, or strip of wood, I sometimes make the hard rubber of a consistency sufficiently thin to allow it to be placed in thin layers on thin materials, and coat a number of them, arranging them one above the other.

The layers or sheets of material, whether of paper or wood, may be of different colors, and different colors may be given to the rubber by means of suitable pigments, if desired.

The layers thus arranged, with the hard-rubber compound between them, I then place in the oven, and vulcanize the rubber as before.

The product, in this case, will be a hard, compact mass, of alternate layers of hard rubber vulcanized, and fibrous material, useful for many purposes in the arts. Handles of all kinds, buttons, dishes, cups, and many other articles, may be turned from it in the usual manner.

Whenever it is desirable to increase the fire-repellent qualities of the vulcanized rubber, it is evident that while in a plastic state, suitable mineral or other substances may be incorporated for that purpose. Or if desired to give it any peculiar color, suitable pigments may be introduced.

It is further obvious that when a surface suitable for black-board or similar purposes, is desired, any gritty material adapted to produce the required surface, may be used.

In the use of the hard-rubber compound, I mean such as usually passes by that name, but do not mean to confine myself to that produced from any particular gum, as it is evident that any gums that can be vulcanized, so as to produce a hard and durable material, will be suitable for my purpose.

The material thus produced, I employ or use for roofing, siding, sheathing, flooring, inside-wall covering for houses, and for making boats, barrels, pails, pans, dishes, tubes, pipes, furniture, boxes, cans, trunks, valises, wagons, black-boards, artificial slates, brackets, mouldings, fencing, posts, sleepers, handles for all kinds of tools, instruments, cutlery, umbrella-sticks, canes, whips, and other articles, as well as for building, coating, and lining vessels, &c.

Having thus described my invention,

What I claim, is—

Covering and uniting paper, woven fabrics, wood, and similar materials, with a hard-rubber compound, and submitting them to the vulcanizing-process, substantially as herein described, and for the purpose set forth.

R. O. LOWREY.

Witnesses:
H. B. MUNN,
P. T. DODGE.